Figure 1:
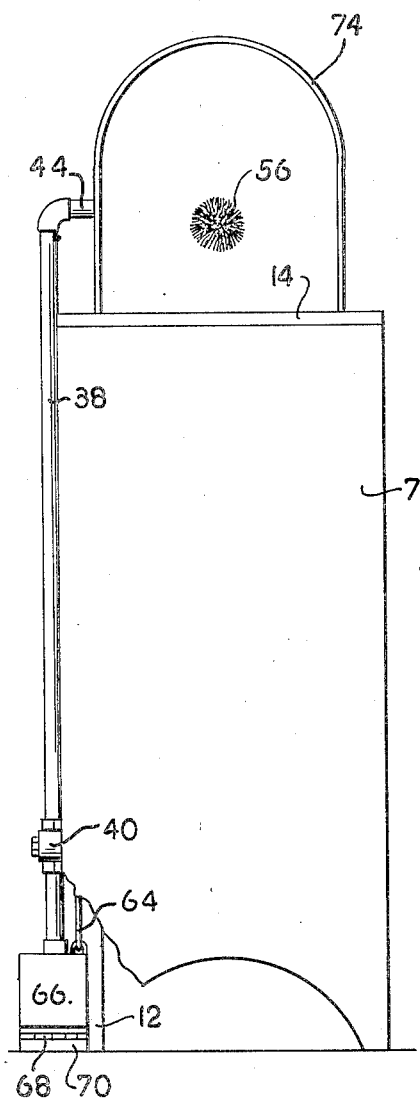

Oct. 14, 1952 S. S. STILL 2,613,391
PREPARATION OF DRAWN POULTRY CARCASSES
Filed Jan. 6, 1950 2 SHEETS—SHEET 1

INVENTOR
SIDNEY S. STILL
BY Harold N. Martin
ATTORNEY

Oct. 14, 1952 S. S. STILL 2,613,391
PREPARATION OF DRAWN POULTRY CARCASSES
Filed Jan. 6, 1950 2 SHEETS—SHEET 2

*INVENTOR*
SIDNEY S. STILL
BY Harold K. Martin
*ATTORNEY*

Patented Oct. 14, 1952

2,613,391

UNITED STATES PATENT OFFICE 2,613,391

PREPARATION OF DRAWN POULTRY CARCASSES

Sidney S. Still, Orlando, Fla.

Application January 6, 1950, Serial No. 137,223

3 Claims. (Cl. 17—45)

This invention relates to the preparation of a drawn poultry carcass for distribution and use.

In the dressing of poultry, it has been customary to remove the easily removable insides of the carcass, but to leave the lungs in the niches of the back of the dressed carcass. Such practice while not being objected to by some people, has caused the more fastidious persons to struggle with the carcass in an effort to remove the lungs and tissue immediately surrounding them. The task is comparatively easy when operating on larger carcasses, but when a small bird is encountered extreme difficulty is experienced in extracting the undesirable matter from the carcass.

The primary object of this invention is to remove the lungs and the tissue immediately surrounding them from a poultry carcass which has been drawn and to cleanse the inside of the carcass so that it may be ready for distribution and immediate use.

Another object is to eliminate the laborious task of removing the lungs and surrounding tissue from drawn poultry carcasses.

The above and other objects may be attained by employing this invention which embodies among its features vigorously brushing the inside of a poultry carcass in the immediate vicinity of the lungs to loosen them from the carcass and while so brushing said carcass directing water there into to flush out matter loosened by the brush.

Other features include directing the water into and through the brush in an amount exceeding that which would saturate the brush to flush out of the carcass matter loosened by the brush and to flush off of the brush matter which might adhere thereto.

Still other features include an apparatus comprising a brush mounted to rotate about a horizontal axis, means to rotate said brush and a nozzle adjacent the brush to direct water toward the brush.

Still further features include a hood partially enclosing the brush and nozzle and manually actuated means to control the flow of water through said nozzle.

In the drawings—

Figure 2:
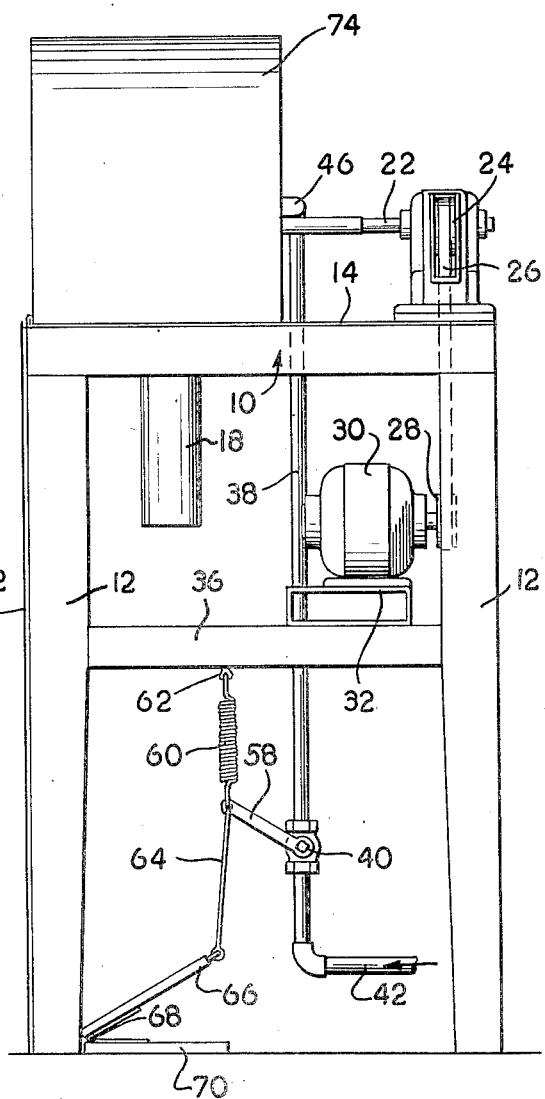
Figure 3:
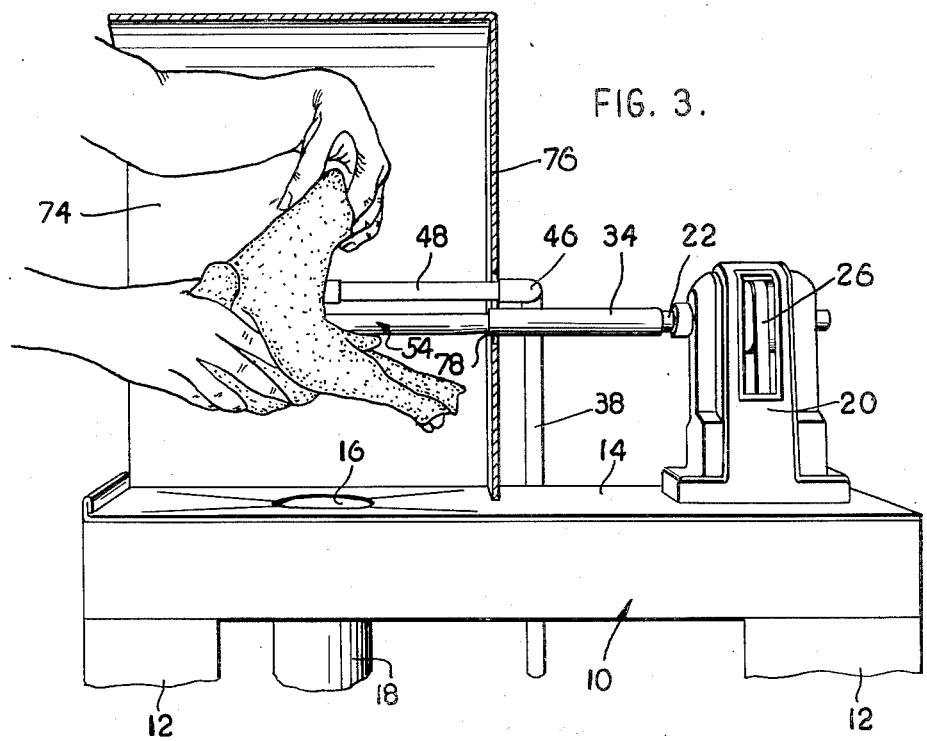
Figure 4:
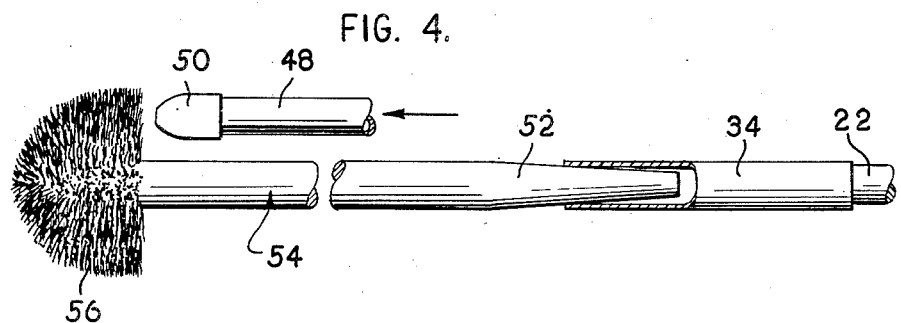
Figure 5:

Figure 1 is a front view of a machine for removing the lungs from a drawn poultry carcass, a portion of the front being broken away more clearly to illustrate certain details of construction, Figure 2 is a side view of the machine illustrated in Figure 1, Figure 3 is a fragmentary enlarged sectional view in perspective of the machine illustrated in Figure 1, Figure 4 is a fragmentary enlarged side view of the brush, brush holder and nozzle of the machine, and Figure 5 is a fragmentary side view partially in section of the pipe and nozzle for directing water into a carcass being treated.

Referring to the drawings in detail a frame designated generally 10 is supported on legs 12 and carries a table top 14 which is provided near one end with an opening 16 to which a drain pipe 18 is connected in any conventional manner. Supported on the table in spaced relation to the opening 16 is an arbor 20 supporting a shaft 22 which rotates in the arbor about a horizontal axis above the table top 14. This shaft is provided intermediate its ends with a drive pulley 24 over which an endless belt 26 is trained. This belt has driving connection with the drive pulley 28 of a conventional electric motor 30, which is mounted on a suitable platform 32, which is supported in any suitable manner intermediate the ends of the legs 12. It will thus be seen that when the motor 30 is energized, the shaft 22 will be rotated. Secured to the shaft for rotation therewith is a socket member 34, having its open end disposed toward the axis of the opening 16 in the table 14.

Secured to a cross member 36, which extends horizontally between the legs 12 intermediate the ends thereof, is a pipe 38 which extends upwardly beside the frame 10 and is provided adjacent its lower end with a suitable valve 40 by which the flow of water into the pipe 38 from a suitable supply pipe 42 may be governed. The upper end of the pipe 38 is equipped with a suitable elbow which is directed toward the shaft 22 above the level thereof and has coupled thereto a pipe length 44 carrying directly above the socket 34 an elbow 46 into which a nipple 48 is coupled. This nipple extends parallel with the axis of the shaft 22 and is provided at its end remote from the elbow 46 with a suitable nozzle 50 which terminates substantially directly above the opening 16 in the table 14.

Removably fitted into the socket 34 on the shaft 22 is the tapered shank 52 of a brush designated generally 54, which shank carries at its end remote from the socket 34 a brush head 56. As illustrated in Figure 4, when the shank 52 of the brush is in proper position in the socket 34, the brush head 56 will intersect the axis of the nozzle 50.

The valve 40 is provided with an operating handle 58 which in turn is connected to one end of a retractile coil spring 60, the opposite end of which is anchored to an eye 62 carried by one of the cross members 36 and pivotally connected to the operating handle 58 is a link 64 which is pivotally coupled, as illustrated in Figure 2, to the free end of a treadle 66, which is hingedly coupled as at 68 to a suitable base or platform 70.

A shield 72 is fixed to the legs 12 at the front end of the frame 10 and removably situated on the table 14 is an arched hood 74 having a back 76 which is provided with an enlarged opening 78 through which the socket 34 and nipple 48 project so as to bring the nozzle 50 and brush head 56 within the confines of the hood 74.

In use a drawn poultry carcass is introduced through the open side of the hood to the interior thereof with the back held upwardly as suggested in Figure 3, so that the brush 56 will engage portions of the interior of the carcass containing the lungs and surrounding tissue. With the motor 30 energized, it will be obvious that the brush head 56 rapidly rotating will tear the lungs from their location within the carcass and upon exerting pressure on the treadle 66, the operating lever 58 of the valve 40 will be moved against the effort of the spring 60 to open the valve 40 and project a jet of water through the nozzle 50 against the brush head 56.

In the preferred operation the volume of water injected into the brush exceeds the point at which the brush becomes saturated so as to flush out of the carcass the matter torn loose therefrom by the rapidly rotating brush. It is obvious that sufficient pressure must be exerted on the carcass to force it against the brush to a degree sufficient to cause the bristles thereof to enter the cavities in which the lungs and surrounding tissue are located. Not only will the water directed through the nozzle 50 flush out the undesirable matter, but it will also serve to wash the inside of the carcass. This action is augmented by the rapidly rotating brush which serves to forcibly throw the excess water against the walls of the carcass.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In the preparation of a drawn poultry carcass for distribution and use, the method of removing the lungs from said carcass which includes vigorously brushing the insides of the carcass in the immediate vicinity of the lungs to loosen them from the carcass and while so brushing said carcass directing water into the carcass to flush out of the carcass matter loosened by the brushing thereof.

2. In the preparation of a drawn poultry carcass for distribution and use, the method of removing the lungs from said carcass which includes vigorously brushing the insides of the carcass in the immediate vicinity of the lungs to loosen them from the carcass, and while so brushing the carcass directing water into and through the carcass in an amount sufficient to flush out of the carcass all matter loosened by the brushing thereof.

3. In the preparation of a drawn poultry carcass for distribution and use, the method of removing the lungs from said carcass which includes vigorously brushing the inside area of the carcass in the vicinity of the lungs thereof to loosen said lungs from the carcass, and while so brushing the carcass directing water into said carcass in a direction normal to the direction in which it is being brushed.

SIDNEY S. STILL.

REFERENCES CITED

The following references are of record in the file of this patent:

UNITED STATES PATENTS

| Number | Name | Date |
|---|---|---|
| 1,479,272 | Young | Jan. 1, 1924 |
| 1,679,323 | Mortlock | July 31, 1928 |
| 2,310,881 | Swanson | Feb. 9, 1943 |
| 2,427,840 | Davis | Sept. 23, 1947 |
| 2,502,794 | Koonz | Apr. 4, 1950 |

FOREIGN PATENTS

| Number | Country | Date |
|---|---|---|
| 323,925 | Great Britain | Jan. 16, 1930 |